United States Patent

[11] 3,623,139

| | | | |
|---|---|---|---|
| [72] | Inventor | Arthur F. Dickerson | |
| | | Woodland Hills, Calif. | |
| [21] | Appl. No. | 874,447 | |
| [22] | Filed | Nov. 6, 1969 | |
| [45] | Patented | Nov. 23, 1971 | |
| [73] | Assignee | General Electric Company | |

[54] METHOD AND APPARATUS FOR AUTOMATICALLY CONTROLLING THE FAST CHARGING OF RECHARGEABLE BATTERIES
7 Claims, 3 Drawing Figs.

[52] U.S. Cl. ..................................... 320/22, 320/17, 320/39
[51] Int. Cl. ..................................... H02j 7/04
[50] Field of Search ........................... 320/17, 19, 15, 20, 22–24, 35, 36, 39, 40, 14, 46, DIG. 1, DIG. 2

[56] References Cited
UNITED STATES PATENTS

| 3,003,100 | 10/1961 | Euwema .................. | 320/17 |
| 3,539,899 | 11/1970 | Dunlop et al. ............ | 320/40 |
| 3,541,422 | 11/1970 | Paulkovich et al. ...... | 320/39 |
| 3,555,395 | 1/1971 | Beery ....................... | 320/96 |
| 2,955,245 | 10/1960 | Payne et al. .............. | 320/36 X |
| 3,085,186 | 4/1963 | Ruetschi ................... | 320/14 X |
| 3,217,226 | 11/1965 | Strain ....................... | 320/DIG. 1 |
| 3,296,515 | 1/1967 | Knauth ..................... | 320/DIG. 2 |
| 3,300,704 | 1/1967 | McMillen .................. | 320/DIG. 2 |
| 3,321,690 | 5/1967 | McCarthy et al. ........ | 320/24 X |
| 3,382,425 | 5/1968 | Legatti ..................... | 320/DIG. 2 |
| 3,465,230 | 9/1969 | Ball .......................... | 320/17 |
| 3,477,009 | 11/1969 | Nichols .................... | 320/23 |
| 3,493,837 | 2/1970 | Sparks et al. ............. | 320/40 X |

Primary Examiner—Gerald Goldberg
Assistant Examiner—John M. Gunther
Attorneys—Nathan J. Cornfeld, Frank L. Neuhauser, Oscar B. Waddell, Joseph B. Forman and John P. Taylor ABSTRACT: A method and apparatus for automatically controlling the fast recharging of a storage battery pack consisting of a number of cells (N). The cells are conditioned so that at least one of them is at a slightly higher charge state than the remaining cells (N-1) before initiating a recharging process. All the cells (N) are connected to a source of charging current and a voltage level responsive circuit is connected across the at least one cell which is at a higher charge state in order to monitor the increasing voltage thereof. The cells (N) are initially charged with a high current until the voltage at the terminals of the cell with the higher charge state abruptly rises and thereby signals to the voltage level responsive circuit that the cell has achieved full charge. At this point, the voltage level responsive circuit causes a transformer tap changing and switching circuit to terminate the high-current fast-charging mode and to establish a low-current slow-charging mode.

INVENTOR:
ARTHUR F. DICKERSON
BY
HIS ATTORNEY

METHOD AND APPARATUS FOR AUTOMATICALLY CONTROLLING THE FAST CHARGING OF RECHARGEABLE BATTERIES

BACKGROUND OF THE INVENTION

This invention relates generally to automatic battery chargers and, more particularly, to a method and apparatus for initially fast-charging a battery pack to within a few percent of rated capacity and then for safely slow-charging the pack until the entire battery is fully charged.

In recharging batteries, the last stages of the process are often marked by the liberation of gases, such as hydrogen and oxygen, at the electrodes. Gas generation and liberation are especially serious in charging secondary storage batteries comprised of sealed nickel-cadmium cells. This problem results from the fact that the gases sealed within these cells build up such pressures during an excessively rapid charging process as to cause venting of the cells (as they attempt to release the abnormally high pressure of the internally generated gases) or even to cause an explosion of the battery.

Various approaches have been taken to automatically and safely fast-charge a battery. These approaches include charging all cells of the battery at a relatively high rate, until the terminal voltage of the entire battery pack reaches a desired value (indicative of a given state of charge) and then, charging the battery at a low rate so as to complete the process. None of the approaches to the problem, however, permit a series arrangement of cells to be charged to within a few percent (2–3 percent) of rated capacity at a high current rate.

Typical overall charge periods may presently range from 12 to 15 hours for series-connected nickel-cadmium cells, with the fast charge portion of each overall period delivering only 70 percent of rated battery capacity within 1 hour. The method and circuit configuration of my invention has provided 98 percent of rated battery charge capacity to series-connected cell packs in periods of less than 30 minutes.

SUMMARY OF THE INVENTION

Accordingly, one object of the present invention is to provide a method and apparatus for fast recharging of batteries, consisting of a plurality of cells, to within a few percent of rated capacity in a period of less than 30 minutes.

It is another object of this invention to provide a method and apparatus for fast-charging a rechargeable battery which method and apparatus preclude the possibility of excessive pressure buildup in the battery, due to overcharging, which buildup might result in the venting or explosion of the battery.

It is still another object of this invention to provide a method and apparatus for initially charging a pack of cells at a predetermined high rate of charge until rated capacity has essentially been reached and then automatically changing the charge rate to a low current for safely completing the charging process.

Briefly stated, the invention provides a method and circuit arrangement for conditioning a plurality of cells to be fast-charged so that at least one of the cells is at a slightly higher charge state than the remaining cells before a charging process is initiated. A source of direct current is connected to all the cells and a voltage level responsive circuit is connected across the at least one cell for detecting a state of full charge in the cell and for causing a transformer and tap changing arrangement to switch the charging process from a high-current mode to a low-current mode.

The subject matter which is regarded as the invention is particularly pointed out and distinctly claimed at the concluding portion of the specification. A preferred embodiment is disclosed in the following detailed description taken in connection with the accompanying drawing in which:

DESCRIPTION OF THE PREFERRED EMBODIMENT

Figure 1:
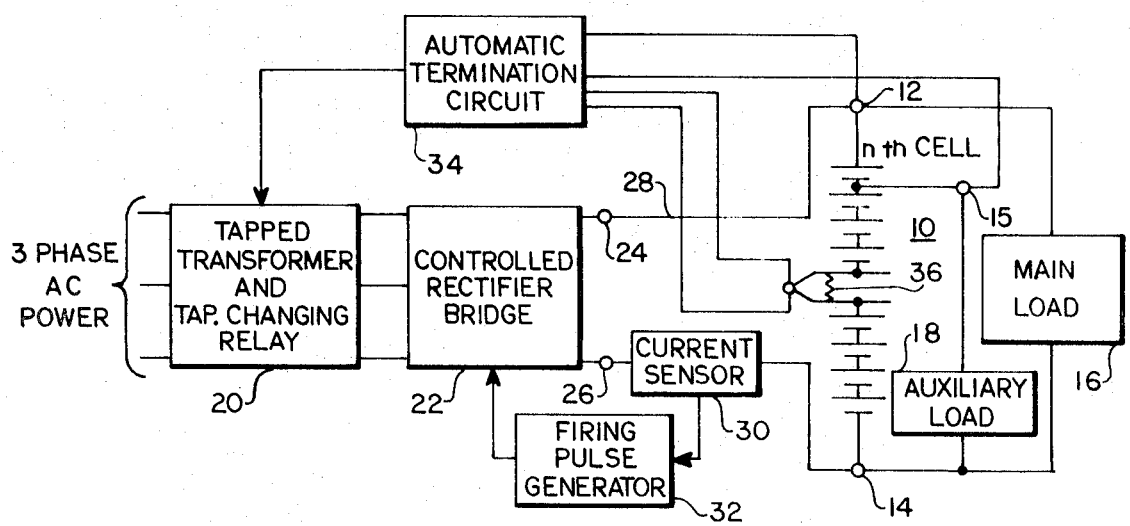
FIG. 1 is a schematic block diagram of the overall circuit arrangement of the preferred embodiment.

Referring now to the drawings in which like numerals are used to indicate like parts throughout the various views thereof, FIG. 1 shows an overall fast-charging circuit arrangement for charging a connected storage battery pack 10 comprised of a number of cells (N). The overall circuit is connected to the battery 10 at a positive terminal 12, a negative terminal 14 and an additional terminal 15 which is provided at the negative terminal of the nth cell (which is the cell next adjacent positive battery terminal 12). During a period of discharge, a main load 16 is connected across the battery terminals 12 and 14 and an auxiliary load 18 is connected across the battery terminals 15 and 14. Through this arrangement, the power for the main load 16 is provided by all the cells (N), in series, while the power for the auxiliary load 18 is simultaneously supplied by all but at least one (N−1) of the cells. For the purposes of this disclosure, (N) stands for the total number of cells in the battery 10 and may be any integer greater than 1.

In order to carry out the above-described loading effect in an electrically powered vehicle, all the cells (N), in series, would be connected to supply the tractive power for the vehicle, while the vehicle controls would be powered by (N−1) of the cells. This process of conditioning (N−1) of the cells so that they are charged slightly less than the remaining cell may also be accomplished by applying the auxiliary load 18 separately after the normal discharge cycle of the (N) cells.

In the overall circuit of the preferred embodiment, three-phase AC power is supplied to a current-rectifying means comprising a transformer with primary taps and a tap-changing relay arrangement indicated as 20. A conventional SCR three-phase bridge 22 is included as part of the current-rectifying means and is connected to the secondary winding of the transformer arrangement 20 for providing controlled DC charge current to the battery pack 10. One such conventional SCR three-phase bridge circuit that may be used in practicing the present invention is illustrated at page 201 of the General Electric Company SCR Manual, fourth edition, published in 1967. The SCR bridge circuit illustrated in the General Electric SCR Manual includes controlled rectifiers in the forward legs and uncontrolled conventional two-terminal rectifiers in the back legs of the bridge circuit.

The SCR bridge 22 is provided with a positive output terminal 24 and a negative output terminal 26. The positive terminal 24 is electrically connected to the positive battery terminal 12 through a conductor 28 while the negative terminal 26 is serially connected with a current-sensor means 30. The current-sensor means 30, in turn, is connected to the negative battery terminal 14. As is well known, the current-sensor means may simply comprise a resistor in series circuit relation with negative terminal 26 of the SCR bridge 22 and the negative battery terminal 14. The voltage developed across such a resistor would be monitored to provide an indication of the current passing therethrough. A firing pulse generator 32 is connected between the current sensor 30 and the SCR three-phase bridge 22 for triggering the SCR's into conduction. The current sensor 30 in conjunction with the firing pulse generator 32 functions to regulate the average charge current by varying the conduction angle of the SCR's.

The cooperative relationship between the current-sensor means 30 and the firing pulse generator 32 is as follows. Any change in the average charge current sensed by the current sensor means, e.g., a resistor, may be manifested as a change in the voltage across said resistor. This error signal affects the regulation of the average charge current by varying the firing angle of the SCR's.

A typical pulse trigger circuit that is conventionally used as a firing pulse generator for triggering SCR's is illustrated at page 76 of the General Electric Company SCR Manual, fourth edition, published in 1967.

An automatic termination circuit 34 is connected across the battery terminals 12 and 15 to terminate the fast-charge mode and to initiate the low-current mode. Termination circuit 34 includes a voltage level responsive circuit which actuates the tap-changing relay system within the transformer arrangement 20 in response to an abrupt terminal voltage rise across the $n$th cell which rise indicates the cell has achieved full charge. Then the tap-changing relay system of the transformer arrangement 20 is thereby actuated, the fast-charging mode is terminated and a low-current charging mode is initiated.

To properly charge in the fast mode, the charging current must be maintained at a substantially constant value (e.g. plus or minus 15 percent) so as to preclude misleading terminal voltage indications from the monitored $n$th cell. Such current control may be achieved by varying the firing angle of the SCR's in the rectifier bridge 22. Under such a scheme, a signal, proportional to charging current, is sent from the current sensor 30 to the firing pulse generator 32 as a negative feedback so that increasing current causes increasing delay of firing pulse which delay, in turn, reduces the average charging current to the battery 10. If the loop gain should not be linear, an adjustable threshold point may be set to provide the desired charge current during the fast-charge mode.

To avoid overcharging the battery 10 at high temperatures, there must be some compensation made for cell temperature in determining the preset termination point of the fast-charge mode. This may be accomplished by utilizing a temperature-sensitive element, such as a thermistor 36 disposed in heat exchange relationship within an appropriate area of the battery and electrically incorporated within the automatic termination circuit 34. Since thermistor resistance generally changes inversely with temperature, the preset value of terminal voltage across the $n$th cell necessary to terminate the fast-charge mode is automatically lowered to safely compensate for excessive temperatures in the battery pack 10.

Figure 2:
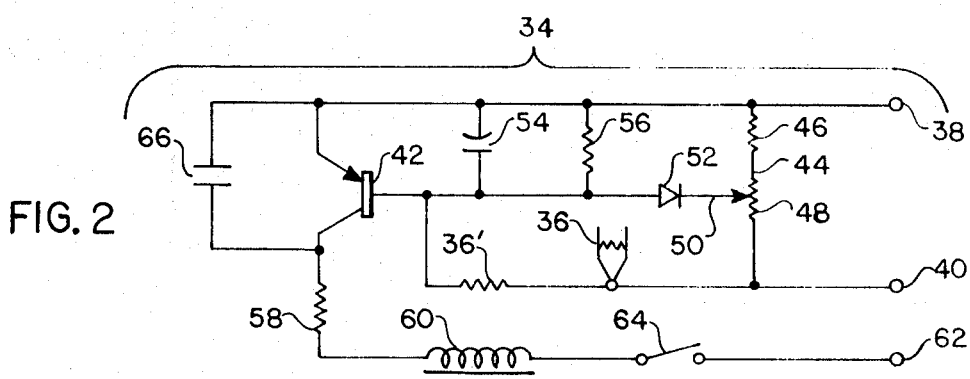
FIG. 2 is a circuit diagram of a voltage level responsive circuit which is a part of the overall circuit arrangement shown in FIG. 1.

FIG. 2 is a schematic circuit diagram of the automatic termination circuit 34 and shows a positive terminal 38 which is to be connected to the positive terminal 12 of the battery pack 10 and a terminal 40 which is to be connected to the additional battery terminal 15. These connections between terminals (38 and 12) and (40 and 15) are such as to impress the terminal voltage of the $n$th cell across terminals 38 and 40 of the automatic termination circuit 34. The thermistor 36 is disposed in series with an associated resistance 36' between the terminal 40 and the base of a transistor 42, the emitter of which is, in turn, connected to the positive terminal 38. A mechanically adjustable potential divider 44, including a resistor 46 in series connection with a potentiometer 48, is provided and is connected between the terminals 38 and 40. The potentiometer 48 is provided with a conventional tap 50 connected to the cathode of a rectifier 52 which is, itself, connected to the base of the transistor 42 by a lead extending from the anode of the rectifier 52 to the transistor base. A smoothing condenser 54 and a resistor 56 are placed in parallel connection across the emitter and the base of the transistor 48. The resistance 56 cooperates with resistance 36' and the thermistor 36 to form a potential divider arrangement responsive to the temperature of the battery pack as sensed by the thermistor 36. The value of the voltage impressed across the base of the transistor 42, therefore, becomes a function of the voltage of said at least one cell and the mechanically adjusted potential divider 44 and the heat-responsive potential divider arrangement comprising the resistance 56, 36' and the thermistor 36.

When the voltage impressed across the base of the transistor 42 exceeds a preset value due to the $n$th cell reaching a greater charge than rated capacity or due to excessive overheating of the battery, the transistor 42 conducts and allows current to flow from the collector to a resistor 58 which is serially connected to a relay coil 60. The relay coil 60 is, in turn, connected to a terminal 62 through a manually operated switch 64 and the terminal 62 is then connected to the negative terminal 14 of the battery pack 10. As sufficient current flows to activate a normally open relay contact 66, associated with the coil 60 and connected between the emitter and collector of the transistor 42, the contacts 66 are forced to latch closed and thereby cause a constant flow of current to bypass the transistor 42 which current is only broken by opening the switch 64 or disconnecting the terminal 38 or 62 from the battery 10. Of course, instead of being manually opened, the switch 64 may be a mechanically controlled device automatically operated as a function of safe charging time.

Briefly stated, in operation, the setting of tap 50 determines the value of terminal voltage across the $n$th cell necessary to actuate the relay coil 60 which, in turn, terminates the fast-charge mode and initiates the low-current mode through a relay to the transformer and tap-changing arrangement 20 detailed later in the disclosure. Since the resistance of the thermistor 36 changes with temperature, the thermistor will cooperate with the associated resistance 56 and 36' to automatically divide the voltage impressed on the base of transistor 42 as to alter, in accordance with battery temperature, the preset value of terminal voltage across the $n$th cell necessary to cause the transistor 42 to conduct. If thermistor 36 is so heated as to reduce the included resistance, below a predetermined value, the voltage impressed across the base of the transistor 42 will then be such as to cause it to conduct and thereby safely terminate the fast charge mode.

Figure 3:
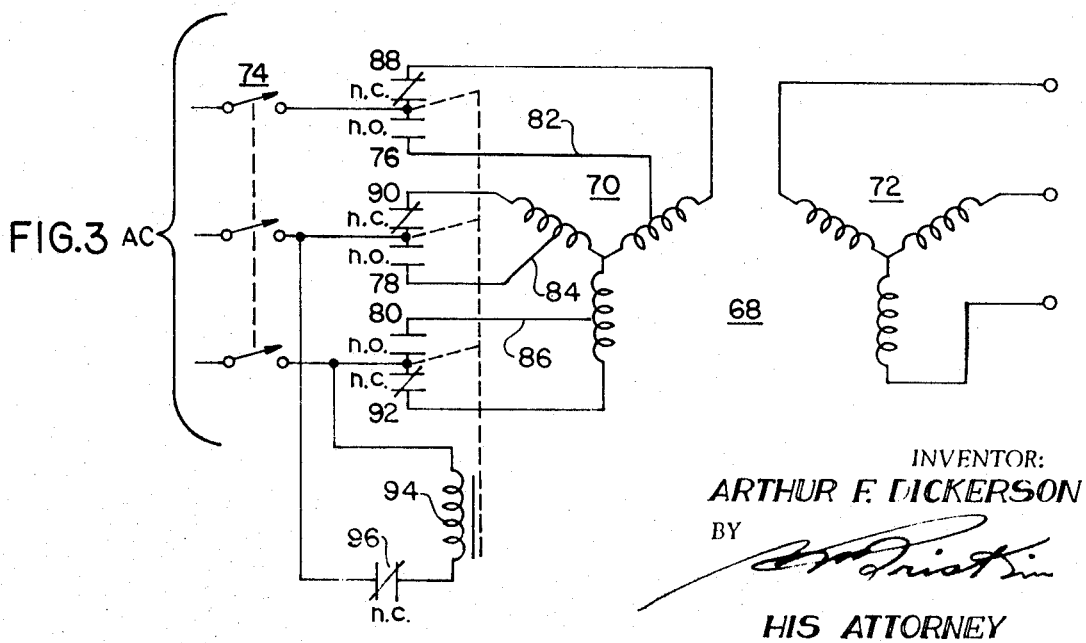
FIG. 3 is a circuit diagram of a transformer tap changing and switching circuit which is a part of the overall arrangement shown in FIG. 1.

The circuit arrangement shown in FIG. 3 includes a three-phase transformer 68 which consists of primary tapped windings 70, connected to an AC power source, and secondary windings 72. A main three-phase switch 74 is connected between the primary windings 70 and the source of power and may be manually or mechanically operated to initiate a charging process. The secondary windings 72 are connected to the SCR bridge 22 (FIGURE 1) so as to transmit an induced secondary voltage thereto.

Normally open relay contacts 76, 78, and 80 are provided and connected between the switch 74 and taps 82, 84, and 86 which are associated with each leg of the primary windings 70. Normally closed relay contacts 88, 90, and 92 are also provided and are connected between the switch 74 and the outer ends of each leg of the primary windings 70. A relay winding 94 and normally closed relay contacts 96, which are associated with the relay winding 60 (shown in FIGURE 2), are serially connected across two phases of the three-phase AC source so that the closing of the main switch 74 causes current to flow through the relay winding 94.

When the main switch 74 is closed to actuate relay winding 94, the normally open contacts 76, 78, and 80 are closed by a mechanical ganged linkage connected with relay 94 and power is delivered to the primary windings 70 through the primary taps 82, 84, and 86. Since the effective number of primary windings 70 is thereby significantly decreased with respect to the secondary windings 72, the current induced in the secondary windings 72 is correspondingly increased and is sufficient to sustain a fast charge mode whereby the battery 10 may be charged to within 2 or 3 percent of capacity within 30 minutes.

When the voltage-responsive circuit of the automatic termination circuit 34 senses an abrupt increase in voltage across the $n$th cell, the relay 60 is actuated and opens the normally closed contacts 96. Opening contact 96 deenergizes relay windings 94 and thereby allows contacts 76, 78, 80, 88, 90, and 92 to return to the normal position. With contacts 88, 90, and 92 now closed, all the windings of the primary 70 are effective and the current induced in the secondary 72 is thereby reduced to a value consistent with a low-current mode of charging.

In overall operation, after the fast-charging mode has been initiated as previously discussed, and when the temperature adjusted voltage at the base of the transistor 42 moves toward the collector voltage, the relay winding 60 is actuated. Upon actuation, relay winding 60 opens the normally closed contacts 96 and closes the normally open contacts 66. Opening contacts 96 allows the ganged relay contacts 88, 90, and 92 to close and thereby initiates the low-current charging mode. The contacts 66 are latched closed by the full battery voltage being impressed across the resistor 58 and the relay winding 60 so as to maintain a current flow through the winding 60 until current is interrupted by opening the circuit at switch 64 or by removing either terminals 38 or 62 from the battery 10.

It should be understood that, while the preferred embodiment is discussed generally as a charger for storage batteries such as nickel-cadmium cells, the invention can be used to charge any rechargeable battery or to even recondition some of the more advanced primary cells which are somewhat responsive to direct current treatment. Likewise, it should be understood that the automatic termination circuit and the tapped transformer and tap-changing relay arrangement, illustrated and described herein, and disclosed as merely typical and the true spirit of the invention is not limited thereto. Similar status is intended for the controlled rectifier bridge, current sensor, and firing pulse generator circuits disclosed herein. It is not necessary to include an input of three-phase AC power or, for that matter, is it even necessary to use a polyphase power source to practice the invention. However, since conventional three-phase power is the most readily available, the preferred embodiment is adapted to be powered by three-phase AC. The battery-conditioning step, whereby at least one of the cells of the multicelled battery is caused to possess a higher charge state than the remaining cells, may be accomplished by discharging the remaining cells to an auxiliary load during or subsequent to a normal discharge process. An alternative method would be to directly charge at least one cell after a normal discharge cycle and before recharging the overall battery so that at least one cell, so directly charged, is slightly more charged than the remaining cells.

While there has been shown what is considered to be the preferred embodiment of the invention, it is of course understood that various other modifications may be made therein as discussed above and it is intended to cover in the appended claims all such modifications as fall within the true spirit and scope of the invention.

What I claim as new and desire to secure by Letters Patent of the United States is:

1. A method for fast-charging a rechargeable battery including at least two cells comprising the steps of:
    a. preconditioning the cells during the discharge period by connecting a first load means across all of said cells and a second load means across all but at least one of said cells so that at the commencement of the charging cycle at least one cell is at a slightly higher charge state than the remaining cells;
    b. supplying a relatively high charging current at a single rate to all cells of the battery;
    c. monitoring the voltage across said at least one cell;
    d. terminating the high charging current and initiating a low charging current in response to an abrupt increase in terminal voltage across said at least one cell.

2. A circuit arrangement for the fast charging of rechargeable batteries consisting of at least two cells comprising:
    a. means for preconditioning said cells during the discharge period so that at the commencement of the charging cycle at least one of said cells is at a higher charge state than the remaining cells comprising a first load means across all of said cells and a second load means across all but at least one of said cells;
    b. means for supplying a relatively high charging current at a single rate to all cells of the battery;
    c. means for monitoring the voltage across said at least one cell; and
    d. means for terminating a fast-charge mode and initiating a low-current charge mode in response to an abrupt increase in terminal voltage across said at least one cell which is at a higher charge state than the remaining cells.

3. A circuit arrangement for the fast charging of rechargeable batteries according to claim 2 wherein said means for terminating a fast-charge mode and initiating a slow-charge mode comprises a voltage level responsive circuit connected across said at least one cell and a transformer tap-changing means operatively connected with said transformer means and controllable by said voltage level responsive means.

4. The circuit arrangement according to claim 2 wherein said rectifying means includes an SCR bridge, and said current-regulating means comprises a current sensor connected with a firing pulse generator connected to said SCR bridge, said firing pulse generator operative to vary the firing angle of the SCR's within said SCR bridge so as to regulate the average current passing therethrough.

5. The circuit arrangement according to claim 3 wherein said voltage level responsive circuit comprises a transistor switch to actuate said transformer tap-changing means and a voltage divider means for presetting the voltage of the at least one cell which will actuate said transistor switch.

6. The circuit arrangement according to claim 5 wherein said voltage divider means includes a temperature-sensitive means for adjusting the preset value of voltage needed across the at least one cell to actuate said transistor switch in response to the temperature of said battery.

7. A method of charging and discharging a battery including at least two cells in a manner permitting fast charging thereof comprising the steps of:
    a. preconditioning the cells by partially discharging all of the cells through a primary load and contemporaneously partially discharging all but one cell through a secondary load so that one cell is at a slightly higher charge state than the remaining cells before charging the battery;
    b. charging the cells at a relatively high charging-current rate;
    c. monitoring the voltage across the cell having the higher charge state;
    d. terminating the high charging-current rate and initiating a low charging-current rate in response to an abrupt increase in terminal voltage across the at least one cell.

* * * * *